(12) United States Patent
Dorrer (10) Patent No.: US 7,385,706 B2
(45) Date of Patent: Jun. 10, 2008

(54) METHOD AND APPARATUS FOR DETERMINING THE NONLINEAR PROPERTIES OF DEVICES AND FIBERS

(75) Inventor: Christophe J. Dorrer, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 623 days.

(21) Appl. No.: 10/949,145

(22) Filed: Sep. 24, 2004

(65) Prior Publication Data

US 2006/0066838 A1     Mar. 30, 2006

(51) Int. Cl.
*G01B 9/02* (2006.01)
(52) U.S. Cl. .................. 356/477; 356/73.1; 356/450
(58) Field of Classification Search ............ 356/73.1, 356/450, 477; 398/28–29
See application file for complete search history.

(56) References Cited

U.S. PATENT DOCUMENTS

| | | | | |
|---|---|---|---|---|
| 6,405,147 | B1* | 6/2002 | Fera ..................... | 702/112 |
| 6,570,394 | B1* | 5/2003 | Williams .................. | 324/620 |
| 2003/0072334 | A1* | 4/2003 | Tanimoto et al. ............. | 372/20 |
| 2003/0137653 | A1* | 7/2003 | Kawabata ................. | 356/73.1 |
| 2004/0197103 | A1* | 10/2004 | Roberts et al. ............. | 398/159 |
| 2004/0218188 | A1* | 11/2004 | Bussard et al. ............. | 356/477 |

OTHER PUBLICATIONS

Yoshinori : "KDD Nonlinear Coefficient Round Robin Measurements for various Dispersion Shifted Fibers in Japan and UK" 2000.*
R.H.Stolen et al. "Self-Phase-Modulation in Silica Optical Fibers" vol. 17,No. 4 ; Apr. 1978.*
Roger H.Stolen et al.: "Measurement of the Nonlinear Refractive Index of Long Dispersion-Shifted Flbers by Self-Phase Modulation at 1.55um" by Journal of Lightwave Technology, vol. 16, No. 6, Jun. 1998.*
Jianjun Yu et al.: "Investgation of cross-phase modulation in WDM systems with NRZ and RZ modulation formats" by Optical Communication Oct. 15, 2000.*
A. J. Taylor et al., "Determination of $n_2$ By Direct Measurement of the Optical Phase", *OptiOcs Letters*, vol. 21, No. 22, Nov. 15, 1996, pp. 1812-1814.
L. P. Barry et al., "Simultaneous Measurement of Optical Fibre Nonlinearity and Dispersion Using Frequency Resolved Optical Grating", *Electronics Letters*, vol. 33, No. 8, Apr. 10, 1997, pp. 707-708.
C. Dorrer et al., "Simultaneous Temporal Characterization of Telecommunication Optical Pulses and Modulators by Use of Spectrograms", *Optics Letters*, vol. 27, No. 15, Aug. 1, 2002, pp. 1315-1317.
C. Dorrer et al., "Linear Optical Sampling", *IEEE Photonics Technology Letters*, vol. 15, No. 12, Dec. 2003, pp. 1746-1748.
C. Dorrer et al., "High-Sensitivity High-Resolution Sampling Using Linear Optics and Waveguide Optical Hybrid", *Optical Fiber Communication Conference*, paper PDP18, 2004.

*Primary Examiner*—Kenneth Vanderpuye
*Assistant Examiner*—Phyowai Lin (57) ABSTRACT

A method and apparatus are provided for measuring samples of the electric field of light propagated through a device under test and determining a nonlinear property of the device, such as self-phase modulation or cross phase modulation, using the measured samples.

8 Claims, 8 Drawing Sheets

Dorrer 11

Figure 1

Dorrer 11

Figure 2

Dorrer 11

Dorrer 11

Dorrer 11

Figure 8

METHOD AND APPARATUS FOR DETERMINING THE NONLINEAR PROPERTIES OF DEVICES AND FIBERS

BACKGROUND OF THE INVENTION

The present invention generally relates to the field of optical communications and more particularly to methods and apparatus for determining nonlinear properties of optical devices and fibers.

Nonlinear effects that cause unwanted impairments may occur during the propagation of light pulses in fibers and other optical devices. For example, self phase modulation (SPM) and cross-phase modulation (XPM) are known to be limiting factors in long-haul optical networks. SPM and XPM effects correspond to an induced temporal phase that is related to the temporal intensity of the pulses themselves (in the case of SPM) or to the temporal intensity of another optical source or a combination of optical sources (in the case of XPM). The coupling between the intensity and phase depends upon the medium, the characteristics of the interacting waves (for example the state of polarization and wavelength) and the nonlinear interaction. For example, in an optical fiber, SPM manifests itself on a signal of intensity $I(t)$ as an intensity-dependent phase $\phi(t)$ such as $\phi(t)=\Gamma I(t)$.

Nonlinear effects are also beneficially used in a wide variety of applications, such as wavelength conversion using a semiconductor optical amplifier, or pulse compression in a nonlinear fiber. Signal processing and pulse compression applications can require a high nonlinear index, since this decreases the required input peak power to achieve a given nonlinear phase shift.

It can be appreciated by those skilled in the art that measurement of the linear and nonlinear properties of optical devices and fibers is an important task in optical telecommunications since these properties can directly impact the propagation of light through devices and fibers.

Various techniques to measure nonlinear effects have been proposed. One proposed technique is based on the generation of an optical signal having known properties, and propagation of the optical signal through a device under test at a power level sufficient to induce modification of the signal via the particular nonlinear effects to be measured or characterized. Using such a technique, the temporal electric field of a short optical pulse can be measured before and after propagation through the device under test, and the comparison of the temporal phase before and after propagation can be used to determine a measurement of the nonlinear coefficient of the device. A limitation of this technique is that the generation of short optical pulses can be complex and costly. Furthermore, pulse characterization is usually devoted to pulses shorter than 100 ps, and these pulses can be modified by chromatic dispersion and polarization-mode dispersion during propagation in the device under test, thereby complicating any analysis of the results.

Another known technique involves propagating light from two CW lasers through a device under test and measuring the optical spectrum after propagation to obtain a nonlinear coefficient. A limiting factor of this technique is that since the wavelengths of the two lasers must be very close to avoid the effects of chromatic dispersion and polarization-mode dispersion, the use of a costly high-resolution optical spectrum analyzer is typically required.

Finally, techniques for measuring the nonlinear refractive index have been demonstrated based on self-phase modulation, cross-phase modulation, four-wave mixing or modulation instability. These techniques typically do not directly measure the phase shift, but instead make a determination from a measured experimental trace, for example, the power and frequency of sidebands in the optical spectrum. Since the determination of the nonlinear properties of the medium is indirect, it can be subject to errors that are difficult to track.

SUMMARY OF THE INVENTION

These and other deficiencies of the prior art are addressed by the present invention which provides a method and apparatus for measuring the nonlinear properties of a device under test.

In one embodiment of the present invention, a method is provided comprising measuring samples of the electric field of light before and after propagating the light through a device under test and determining a nonlinear property of the device using the measured samples. The nonlinear property of the device may be determined by determining the difference between the phase of samples measured before propagating the light through the device under test and samples measured after propagating the light through the device under test, and determining the nonlinear property of the device under test using the intensity of measured samples of the light and the determined phase difference.

In another embodiment of the present invention, a method is provided comprising measuring a plurality of samples of the electric field of light propagated through a device under test using a plurality of input powers, and determining a nonlinear property of the device under test using the plurality of measured samples. The nonlinear property of the device under test may be determined by determining the proportionality between the intensity and phase of samples measured for each of the plurality of input powers, and determining a nonlinear parameter of the device under test using the determined proportionalities.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings.

DETAILED DESCRIPTION OF THE INVENTION

Methods and apparatus for measuring the nonlinear properties of a device are described. The nonlinear properties of a device (or fiber) under test are obtained by comparison of the phase and intensity of samples of the electric field of light measured before and/or after propagation through the device under test.

Although the present invention will be discussed in the context of a diagnostic system for use in the optical communication environment, those skilled in the art will appreciate that the present invention may be advantageously implemented in substantially any application where it is desirable to characterize nonlinear effects and/or to determine the nonlinear properties of a medium.

In accordance with aspects of the invention samples of the electric field (e.g. the intensity and phase) of light propagated through a fiber or other device under test can be measured using, for example, linear optical sampling.

Figure 1:
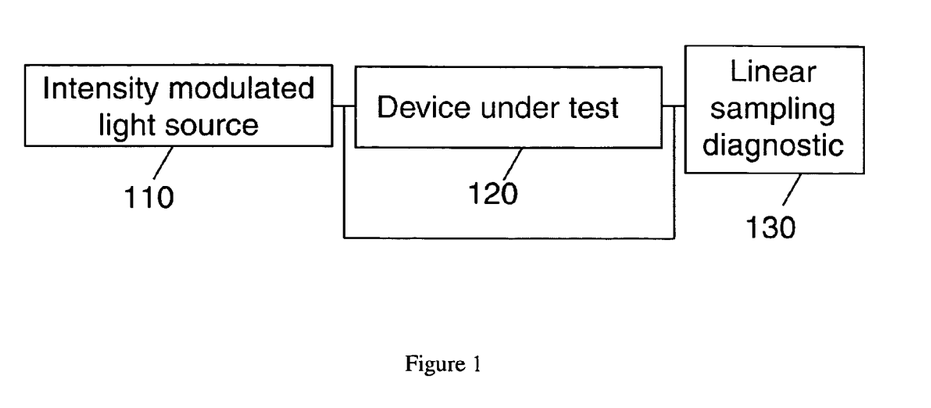
FIG. 1 is a block diagram illustrating one embodiment of an apparatus in accordance with the present invention.

In one preferred embodiment of the present invention, a method to measure SPM is provided and described herein with reference to FIG. 1. For light from a light source 110 with electric field $E(t)=\sqrt{I(t)}\exp[i\phi(t)]$, where $I(t)$ is the temporal intensity and $\phi(t)$ is the temporal phase, propagation into a device under test 120 with a nonlinear parameter $\Gamma_{SPM}$ induces a temporal phase shift $\Gamma_{SPM}\cdot I(t)$ via self-phase modulation. The output electric field after propagation through the fiber is therefore $E(t)\cdot\exp[i\Gamma_{SPM}\cdot I(t)]=\sqrt{I(t)}\cdot\exp[i\phi(t)+i\Gamma_{SPM}\cdot I(t)]$, where the contribution of chromatic dispersion has been neglected.

The light preferably has an intensity $I_0+I_1\cdot f(t)$ before the device under test 120, where $f(t)$ is a time-dependent function with time-averaged value equal to zero, and $I_0$ is the average power of the light. Preferably, a linear sampling diagnostic apparatus 130 is used to measure samples of the electric field of the source before and after the device under test 120. It is understood that the temporal intensity measured before and after the device under test 120 are identical up to a multiplicative constant due to the losses in the device under test 120. The samples of the temporal intensity measured before (or after) the device under test 120 can be normalized to give $$\Delta I(t) = \frac{I_1}{I_0} f(t) \quad (1)$$

The time-dependent phase measured before and after differ by the temporal phase induced by self-phase modulation $\Gamma_{SPM}\cdot I_1\cdot f(t)$. Subtracting samples of the phase measured before the device under test from samples of the phase measured after the device under test leads to samples of $\Gamma_{SPM}\cdot I_1(t)$, which can be written as $$\Delta\varphi(t) = \Gamma_{SPM} \cdot I_0 \cdot \frac{I_1}{I_0} \cdot f(t) = \Gamma_{SPM} \cdot I_0 \cdot \Delta I(t) \quad (2)$$

The proportionality $\Gamma_{SPM}\cdot I_0$ between the normalized samples of the intensity $$\frac{I_1}{I_0} f(t)$$

and the samples of phase difference $$\Gamma_{SPM} \cdot I_0 \cdot \frac{I_1}{I_0} f(t)$$

can be determined, for example, using a linear fit of $\Delta\phi$ vs. $\Delta I$. The average power of the light from the light source 110 $I_0$ is measured, preferably using an optical powermeter (not shown). The constant $\Gamma_{SPM}$, i.e., the nonlinear parameter of the device under test 120 fiber for SPM, is obtained. Those skilled in the art will appreciate that while samples of the temporal intensity measured before the device under test 120 have been used, alternative embodiments of the invention could use samples of the intensity of the light measured only after the device under test 130.

Figure 2:
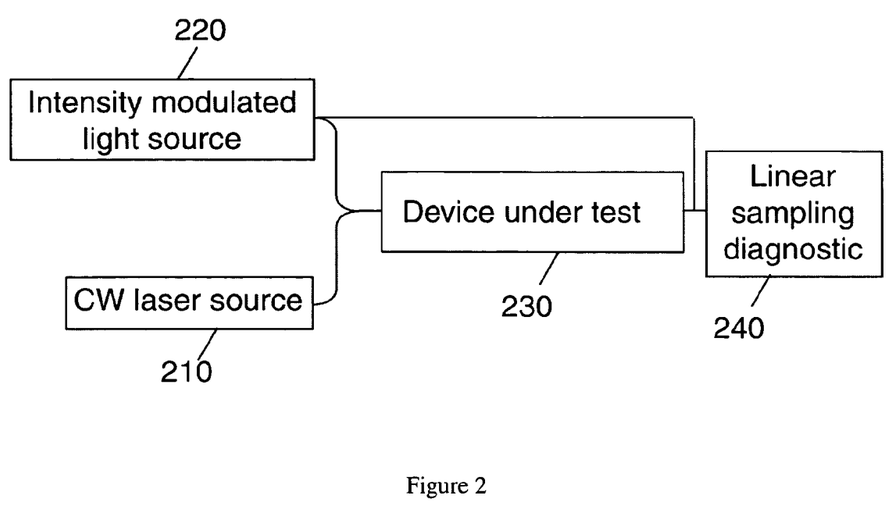
FIG. 2 is a block diagram illustrating another embodiment of an apparatus in accordance with the present invention.

In another embodiment of the present invention, a method is provided to measure XPM, and is described herein with reference to FIG. 2. A CW laser source 210 and an intensity-modulated source 220 are employed to generate light for propagation through a device under test 230. The CW laser source 210 is preferably set to generate light at an optical frequency that is substantially different from that of the intensity modulated light source 220.

The electric field of the intensity modulated light can be written as $E(t)=\sqrt{I(t)}\exp[i\phi(t)]$, where $I(t)$ is the temporal intensity and $\phi(t)$ is the temporal phase. The light from the CW laser source 210 and the intensity modulated light source 220 are coupled and propagated through the device under test 230. Those skilled in the art will appreciate that such propagation induces a temporal phase shift $\Gamma_{XPM}\cdot I(t)$ on light from the CW laser source 210 via cross-phase modulation. The value of $\Gamma_{XPM}$ depends upon the device under test 230 and upon the characteristics of the two sources 210, 220, for example, their relative state of polarization and their wavelengths. The field of the light around the optical frequency of the CW laser source 210 after propagation through the device under test 230 is therefore $\exp[i\Gamma_{XPM}\cdot I(t)]$, where the contribution of chromatic dispersion has been neglected.

The intensity-modulated light from the intensity modulated light source 220 preferably has an intensity $I_0+I_1\cdot f(t)$ before the device under test 230, where $f(t)$ is a time-dependent function with time-averaged value equal to zero and $I_0$ is the average power of the light. Preferably, a linear sampling diagnostic apparatus 240 is used to measure samples of the electric field of the light from the intensity modulated light source 220 before and after the device under test 230 and the light from the CW laser source 210 after the device under test 230. It is apparent that the temporal intensities measured before and after the device under test 230 are identical up to a multiplicative constant due to the losses in the device under test 230. The samples of the temporal intensity of the light from the intensity modulated light source 220 measured before the device under test 230 can be normalized to give $$\Delta I(t) = \frac{I_1}{I_0} f(t) \quad (3)$$

The time-dependent phase measured on the light around the CW laser source 210 after the device under test 230 is $\Gamma_{XPM} \cdot I_1 \cdot f(t)$, which can be written as $$\Delta\varphi(t) = \Gamma_{XPM} \cdot I_0 \cdot \frac{I_1}{I_0} \cdot f(t) = \Gamma_{XPM} \cdot I_0 \cdot \Delta I(t) \quad (4)$$

The proportionality $\Gamma_{XPM} \cdot I_0$ between the normalized samples of the intensity $$\frac{I_1}{I_0} f(t)$$

and the samples of phase $$\Gamma_{XPM} \cdot I_0 \cdot \frac{I_1}{I_0} \cdot f(t)$$

can be determined, for example, using a linear fit of $\Delta\phi$ vs. $\Delta I$. The average power of light from the intensity modulated light source 220 $I_0$ is measured preferably using an optical powermeter in linear sampling diagnostic apparatus 240. The constant $\Gamma_{XPM}$, i.e. the nonlinear parameter of the device for XPM of the intensity modulated light source 220 on the CW laser source 210, can thus be obtained.

Those skilled in the art will appreciate that, while samples of the temporal intensity measured before the device under test 230 have been used for the intensity modulated light source 220, alternative embodiments of the invention could use samples of the intensity measured only after the device under test 230.

Figure 3:
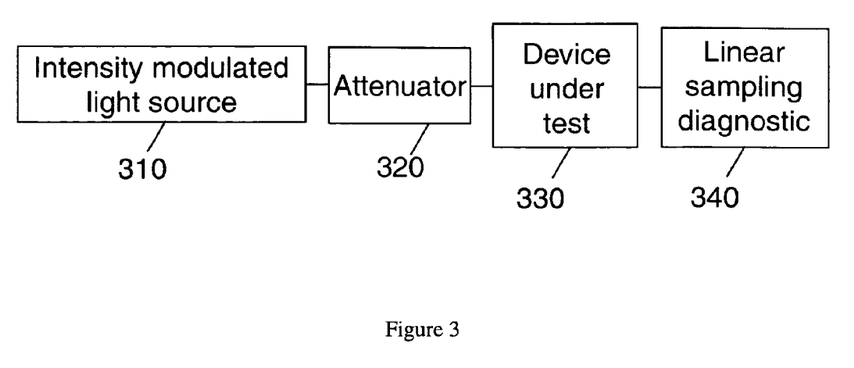
FIG. 3 is is a block diagram illustrating another embodiment of an apparatus in accordance with the present invention.

In another embodiment of the present invention, a method is provided to measure SPM and is described with reference to FIG. 3. The electric field of light from an intensity modulated light source 310 can be written as $E(t) = \sqrt{I(t)} \exp[i\phi(t)]$, where $I(t)$ is the temporal intensity and $\phi(t)$ is the temporal phase. The intensity of the light is preferably written as $I_0 + I_1 \cdot f(t)$, where $f(t)$ is a time-dependent function with time-averaged value equal to zero.

The light from the intensity modulated light source 310 is preferably then propagated into an attenuator 320 with transmission T and then into a device under test 330. While an attenuator 320 is used in the description of this embodiment, it will be apparent to those skilled in the art that alternative embodiments can be implemented using any operation leading to a modification of the input power of the light at the input of the device under test 330.

The time-dependent phase induced by the propagation of the light through the device under test 330 due to SPM is $\Gamma_{SPM} \cdot T \cdot I_1(t)$, so that the phase of the light after the device under test 330 is $\phi(t) + \Gamma_{SPM} \cdot T \cdot I_1(t)$. Samples of the electric field of the light after the device under test 330 are measured, preferably using a linear optical sampling diagnostic apparatus 340. The samples of the intensity can be normalized in order to yield $$\Delta I(t) = \frac{I_1}{I_0} \cdot f(t) \quad (5)$$

The time-dependent part of the measured phase of the light is $\phi(t) + \Gamma_{SPM} \cdot T \cdot I_1 \cdot f(t)$, and can be written as:

$$\Delta\phi(t) = \phi(t) + \Gamma_{SPM} \cdot T \cdot I_0 \cdot \Delta I(t) \quad (6)$$

where $\phi(t)$ is the temporal phase before the device under test 330, $\Gamma_{SPM}$ is the nonlinear parameter for the device under test 330, $I_0$ is the average power for T=1 and T is the transmission of the attenuator 320. It is apparent from Eq. 5 and 6 that if the temporal phase before the device under test 330 is substantially zero, the time dependent intensity and phase of Eq. 5 and Eq. 6 are proportional. Such proportionality can be determined, for example, by performing a linear fit of $\Delta\phi$ vs. $\Delta I$. For a given transmission T, the proportionality is $\Gamma_{SPM} \cdot T \cdot I_0$. In the presence of the phase $\phi(t)$, however, the phase samples are not directly proportional to the intensity. A linear fit leads in this case to $\alpha + \Gamma_{SPM} \cdot T \cdot I_0$ where $\alpha$ is a constant independent upon T. Performing a measurement of samples of the electric field of the intensity modulated light source 310 after the device under test 330 for various input average powers leads to the function $$s(T) = \alpha + \Gamma_{SPM} \cdot T \cdot I_0 \quad (7)$$

Equation 7 shows that the measured proportionality between phase and intensity of the light is a linear function of the attenuation T. The slope of this function $\Gamma_{SPM} \cdot I_0$ can be obtained, for example, using a linear fit of s vs. T. The average power of the source $I_0$ is measured preferably using an optical powermeter (not shown). The constant $\Gamma_{SPM}$, i.e., the nonlinear parameter of the fiber $\Gamma_{SPM}$ for SPM, is thus obtained.

One advantage of performing measurements for various values of T is to reduce noise and remove any effect of the initial phase of the light propagated through the device under test 330. While removal of these effects was performed in the embodiments discussed above by performing a linear fit for various input powers, it is understood that this could be performed identically by fitting the difference between two sets of phase samples measured for two different input powers, since this substantially cancels the presence of the initial phase of the intensity modulated light source 310 $\phi(t)$.

Figure 4:
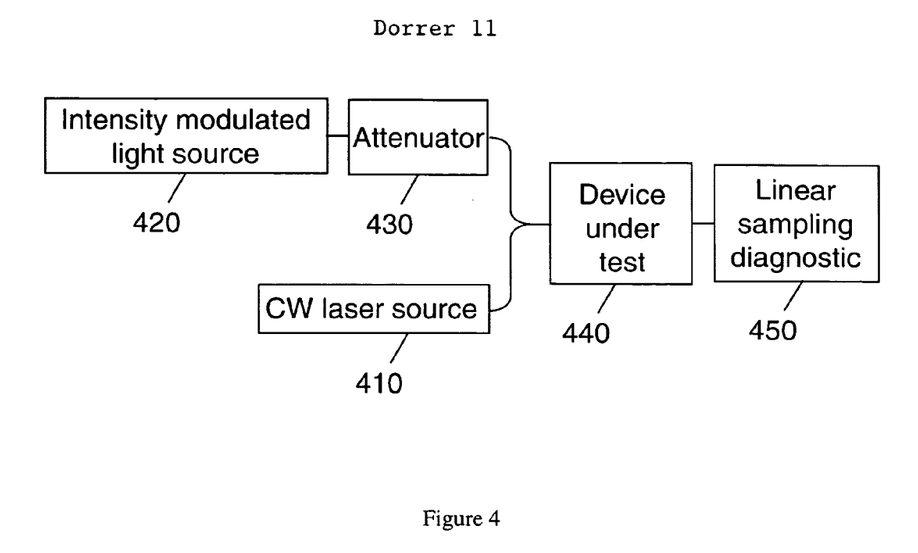
FIG. 4 is a block diagram illustrating another embodiment of an apparatus in accordance with the present invention.

In another embodiment of the present invention, a method is provided to measure XPM, and is described herein with reference to FIG. 4. A CW laser source 410 and an intensity modulated light source 420 are employed. The CW laser source 410 is preferably set at an optical frequency that is substantially different from that of the intensity modulated light source 420. The electric field of the intensity modulated light from the intensity modulated light source 420 can be written as $E(t) = \sqrt{I(t)} \exp[i\phi(t)]$, where $I(t)$ is the temporal intensity and $\phi(t)$ is the temporal phase. Light from the intensity modulated light source 420 is preferably sent into an attenuator 430. While an attenuator 430 is used in the description of this embodiment, it will be apparent to those skilled in the art that alternative embodiments can be implemented using any operation leading to a modification of the input power of the light at the input of the device under test 440.

The light from the CW source 410 and the intensity modulated light source 420 are preferably coupled and propagated into a device under test 440. Such propagation induces a temporal phase shift $\Gamma_{XPM}\cdot I(t)$ on light from the CW laser source 410 due to cross-phase modulation. The field of the light around the optical frequency of the CW laser source 410 after propagation through the device under test 440 is therefore $\exp[i\Gamma_{XPM}\cdot I(t)]$, where the contribution of chromatic dispersion has been neglected.

The intensity-modulated light preferably has an intensity $TI_0+TI_1\cdot f(t)$ before the device under test 440, where f(t) is a time-dependent function with time-averaged value equal to zero, T is the transmission of the attenuator and $I_0$ is the average power of the light at the input of the device under test 440 for T=1. Preferably, a linear sampling diagnostic apparatus 450 is used to measure samples of the electric field of light from either the intensity modulated light source 420 or the light from the CW laser source 410 after the device under test 440. It is understood that the temporal intensities measured before or after the device under test 440 are identical up to a multiplicative constant due to the losses in the device under test 440. It will be apparent to those skilled in the art that, while samples of the temporal intensity measured after the device under test 440 are considered for light from the intensity modulated light source 420 in the following description of the embodiment, alternative embodiments of the invention could use samples of the intensity measured before the device under test 440. The samples of the temporal intensity of light from the intensity modulated light source 420 measured after the device under test 440 for a given input power (i.e., for a given transmission T) can be normalized to give $$\Delta I(t) = \frac{I_1}{I_0} f(t) \qquad (8)$$

The time-dependent phase measured on the light around the CW laser after the device is $\Gamma_{XPM}\cdot T\cdot I_1\cdot f(t)$, which can be written as $$\Delta\varphi(t) = \Gamma_{XPM}\cdot T\cdot I_0\cdot \frac{I_1}{I_0}\cdot f(t) = \Gamma_{XPM}\cdot T\cdot I_0\cdot \Delta I(t) \qquad (9)$$

The proportionality $\Gamma_{XPM}\cdot T\cdot I_0$ between the normalized samples of the intensity $$\frac{I_1}{I_0} f(t)$$

and the samples of phase $$\Gamma_{XPM}\cdot T\cdot I_0\cdot \frac{I_1}{I_0}\cdot f(t)$$

can be determined, for example, using a linear fit. The average power of light from the intensity modulated light source 420 $I_0$ is preferably measured using an optical powermeter (not shown). The constant $\Gamma_{XPM}$, (i.e., the nonlinear parameter of the device under test 440 for XPM of the light from the intensity modulated light source 420 on the light from the CW laser source 410), can be obtained, for example, with a linear fit of $\Delta\phi$ vs. $\Delta I$. It is apparent that since the initial phase of the CW laser is essentially zero, a single measurement of samples of the temporal intensity of the intensity modulated source 420 and a single measurement of samples of the temporal phase of the CW laser source 410 after the device under test 440 for a single value of the transmission T of the attenuator 430 are sufficient to obtain a determination of the constant $\Gamma_{XPM}$. Measurements performed for a plurality of values of the transmission T can be used in practice to reduce the noise and uncertainty on the determination of $\Gamma_{XPM}$.

Advantageously, the methods according to embodiments of the invention using the techniques discussed above do not require optical spectra measurement, and can therefore be implemented at any modulation frequency smaller than the bandwidth of the detection system. Such methods can therefore be used to measure the nonlinear parameter of a fiber at various modulation frequencies to separate the various contributions to the nonlinear index. It is understood that the nonlinear properties of a medium can be frequency-dependent. For example, the nonlinear index of fibers that is used to describe XPM and SPM depends upon the bandwidth of the sources because various contributions to that index have different bandwidth. Because the methods according to embodiments of the present invention rely on a direct measurement of the induced phase, the amplitude of the nonlinearity is exactly measured. Additionally, the sign of the nonlinearity is also measured. The sign of the nonlinearity is usually not a concern in optical fibers, but this aspect of the present invention could be useful for the characterization of the nonlinear properties of other structures. Finally, while most other prior art techniques can only be used for SPM, the embodiments of the present invention can be used to determine the properties of a device under test for SPM and XPM.

Because the linear effects of PMD and chromatic dispersion on light propagating in a fiber or device usually increase with the optical bandwidth of the source, it will be apparent to those skilled in the art that the use of a narrowband light source in techniques measuring nonlinear effects is preferable. While this might be difficult in other measurement techniques known in the art, the present invention can advantageously be implemented with a narrowband intensity modulated source. As sampling techniques, such as linear optical sampling, can operate regardless of the bandwidth of the source (or plurality of sources) under test, the embodiments of the invention can be implemented with narrowband sources, and more generally sources of arbitrary bandwidth.

Figure 5:
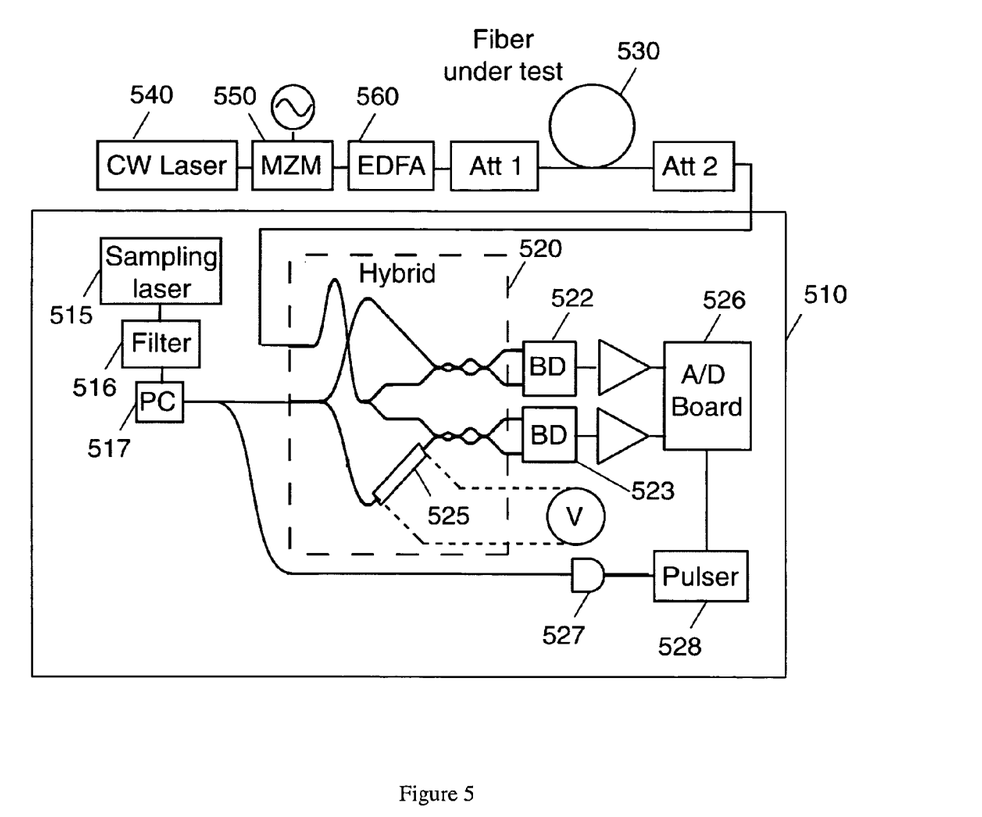
FIG. 5 is a block diagram illustrating an experimental setup used to test aspects of the present invention.

Aspects of embodiments of the present invention were experimentally tested on a 600-meter long highly nonlinear fiber. The experimental setup is shown in FIG. 5. A linear optical sampling diagnostic apparatus 510 was composed of a 10 MHz passively mode-locked fiber sampling laser 515, a spectral filter 516 and polarization controller 517 to match the spectrum and polarization state of the light propagated through a fiber under test 530, a waveguide optical hybrid 520 and two balanced detectors 522, 523.

The output from the two balanced detectors 522, 523 (which were in proper quadrature for an appropriate setting of the voltage V applied to a thermooptic phase shifter 525 in one of the waveguides) were measured by an A/D board 526 and processed to obtain samples of the electric field of the light propagated through the fiber under test 530. Simultaneous acquisition of the two outputs from the two balanced detectors 522, 523 synchronized with the sampling pulse was obtained using a photodiode 527 and a pulser 528. The acquired samples were processed to obtain samples of the electric field of the light propagated through the fiber under test 530. Those skilled in the art will appreciate that a computer (not shown) is coupled to the A/D board for performing the optical sampling diagnostic.

Figure 6:
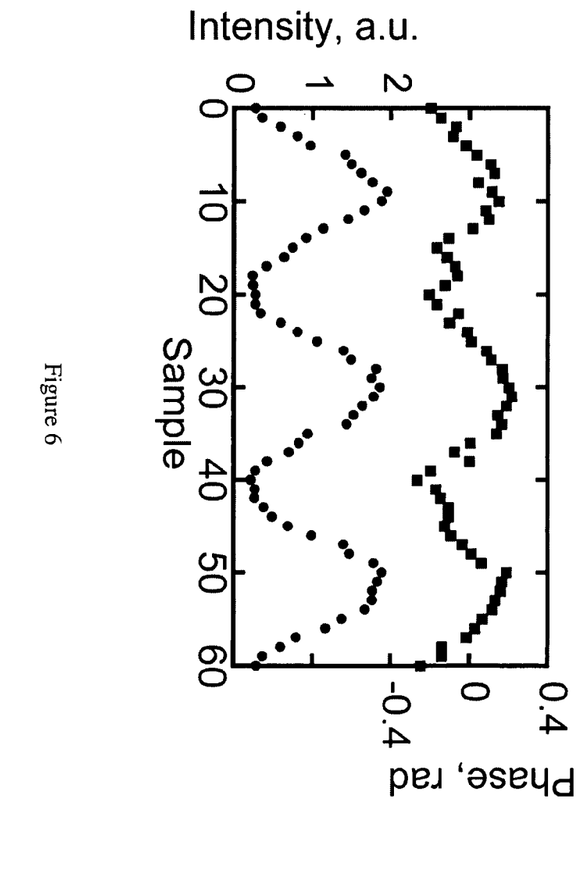
FIG. 6 is a graph showing the temporal intensity and phase of light measured after nonlinear propagation in a highly nonlinear fiber.

Light from a CW laser 540 was modulated using a LiNbO$_3$ Mach-Zehnder modulator 550 driven by a 500 MHz RF sine wave. The modulated light was then amplified with an erbium doped fiber amplifier (EDFA) 560, and sent to a programmable attenuator (ATT1) coupled to the fiber under test 530. After the fiber under test 530, an additional attenuator (ATT2) was used in order to send a constant power to the linear sampling diagnostic apparatus 510. The output electric field was measured for 15 attenuations ranging from 0 (T=1) to 14 dB (T=0.04). The intensity and phase of Eq. 5 and 6 discussed above are plotted on FIG. 6 for T=1.

Figure 7:
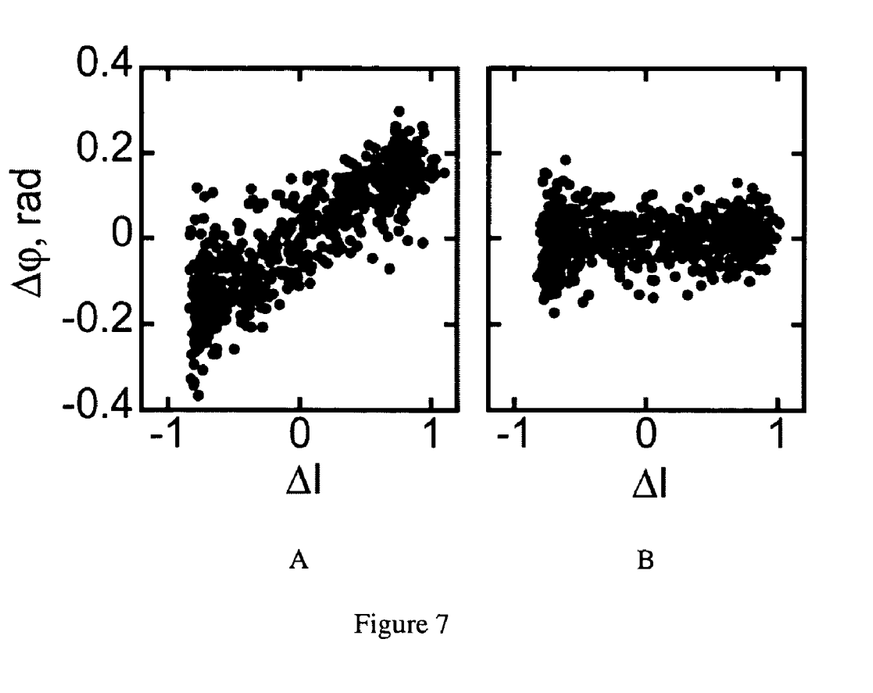
FIGS. 7A-B are graphs showing the phase of measured samples as a function of the intensity of the measured samples for propagation in a highly nonlinear fiber at two different power levels.

Two examples of the relation between intensity modulation and phase modulation for T=1 and T=0.04 are plotted in FIGS. 7A-B. A strong linear dependence between phase and intensity can be seen at T=1 (i.e. for high input powers), while no such dependence is observed for T=0.04 owing to the absence of significant intensity-dependent phase modulation.

Figure 8:
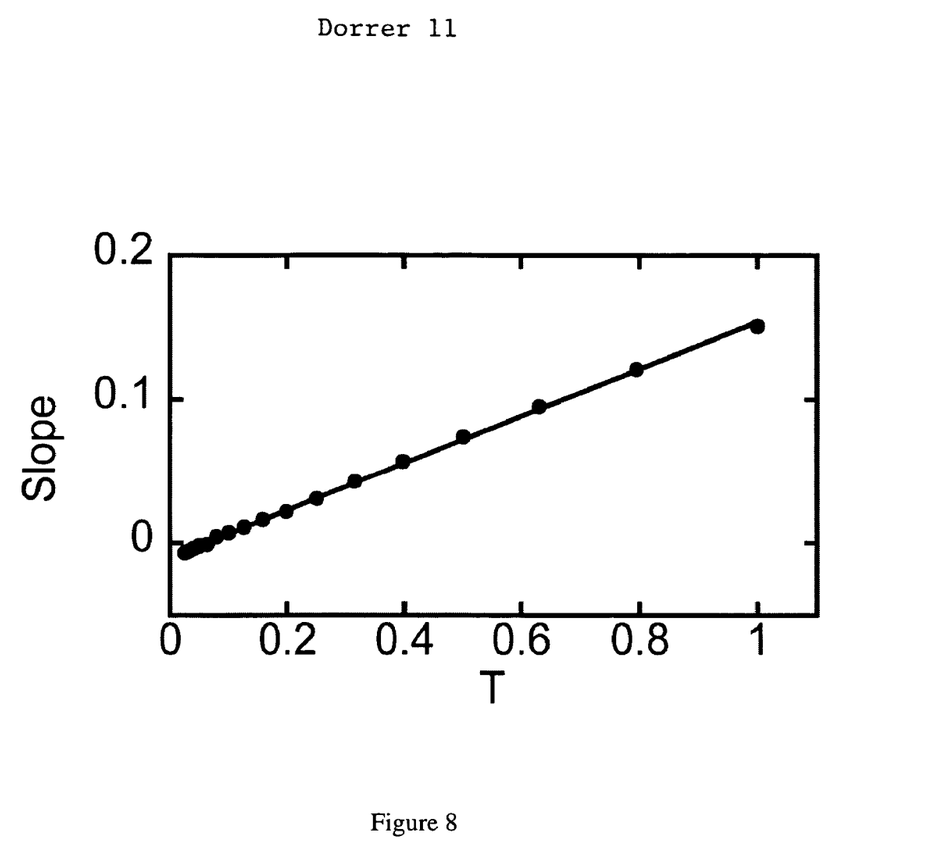
FIG. 8 is a graph illustrating the strength of the nonlinear coupling as a function of the power of the source.

The angle vs. attenuation (i.e., the quantity given by Eq. 7 discussed above) for the fiber under test 530 is plotted in FIG. 8. A linear dependence is observed. It should be noted that the dependence between phase and intensity is non-zero at low input powers, which shows that there is some initial phase modulation on the modulated light, hence the benefit of measuring s(T) for several attenuations T. From the measured slope (0.178) and known input average power (14.8 dBm), a nonlinear coefficient for SPM $\Gamma_{SPM}$=5.9 W$^{-1}$ was calculated for the fiber under test 530.

A determination of the nonlinear coefficient in accordance with prior art techniques using SPM-induced sidebands on the spectrum of two CW lasers was also performed for comparison. The lasers were set at 1535.9 nm and 1536.1 nm. The nonlinear parameter measured using the two CW lasers technique known in the prior art, as discussed above, $\Gamma_{SPM}$=6.09 W$^{-1}$, was found to be in agreement with the nonlinear parameter determined in accordance with embodiments of the method of the present invention.

Although the steps of embodiments of the invention discussed herein and recited in the appended method claims are expressed in a particular sequence, unless the claim recitations otherwise specify or imply a particular sequence for implementing some or all of those steps, those steps are not necessarily intended to be limited to being implemented in that particular sequence.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

I claim:

1. A method for determining a nonlinear property of an optical device under test (DUT), the method comprising the step of:
    measuring a plurality of samples of a temporal electric field of a light before and after propagating the light through the optical device under test, by measuring, using a linear optical sampling, one or more temporal phase samples and corresponding one or more temporal intensity samples;
    wherein said measuring, using the linear optical sampling, is performed by measuring a first and a second quadrature output of an interference between the temporal electric field of the light and the electric field of a sampling light, and wherein said step of measuring the first and second quadrature outputs is synchronized with the sampling light; and
    wherein determining the nonlinear property of the optical device under test includes: determining a difference between the phase of one or more temporal phase samples measured before propagating the light through the optical device under test and the phase of the corresponding one or more temporal phase samples measured after propagating the light through the optical device under test and determining the nonlinear property of the optical device under test by determining a proportionality between the measured temporal intensity samples of the temporal electric field of the light and the determined corresponding phase differences.

2. The method according to claim 1, wherein the light is intensity modulated.

3. The method according to claim 1, wherein the light is generated using an intensity modulated source and a CW laser source; and wherein measuring the plurality of samples of the temporal electric field of light includes:
    measuring one or more temporal intensity samples of the temporal of the light from the intensity modulated light source;
    measuring one or more temporal phase samples of the temporal electric field of the light from the CW laser source after propagating the light through the optical device under test; and
    wherein the nonlinear property is cross-phase modulation.

4. A method for determining a nonlinear property of an optical device under test (DUT), the method comprising the step of:
    measuring a plurality of samples of a temporal electric field of a light before and after propagating the light through the optical device under test, by measuring, using a linear optical sampling, one or more temporal phase samples and corresponding one or more temporal intensity samples, wherein the plurality of samples is measured for a plurality of input power of the light;
    wherein said measuring, using the linear optical sampling, is performed by measuring a first and a second quadrature output of an interference between the temporal electric field of the light and the electric field of a sampling light, and wherein said step of measuring the first and second quadrature outputs is synchronized with the sampling light; and
    wherein determining the nonlinear property of the optical device under test includes: determining the proportionality between a measured differential temporal intensity and differential temporal phase samples for each of the plurality of input power of the light and determining the non-linear property of the optical device under test using the determined proportionalities; where in the nonlinear property is self-phase modulation.

5. The method according to claim 4, wherein the light is intensity modulated.

6. The method according to claim 1, wherein the light is generated using an intensity modulated source and a CW laser source; and wherein measuring the plurality of samples of the temporal electric field of light includes:
    measuring one or more temporal intensity samples of the temporal of the light from the intensity modulated light source and one or more temporal phase samples of the temporal electric field of the light from the CW laser source; where in determining the nonlinear property of the optical device under test includes:

wherein the nonlinear property is cross-phase modulation.

7. An apparatus for determining a nonlinear property of an optical device under test (DUT), the apparatus comprising:
- means for measuring a plurality of temporal intensity and temporal phase samples of the temporal electric field of light before and after propagating through the optical device under test, said means further including,
- means for generating a sampling light;
- means for measuring in synchronization with the sampling light, a first and a second quadrature output of an interference between the temporal electric field of the light and the electric field of the sampling light; and
- means for determining a the nonlinear property of the optical device under test using measured temporal intensity and temporal phase samples by determining a proportional between a measured differential temporal phase and differential temporal intensity samples.

8. An apparatus for determining a nonlinear property of an optical device under test (DUT), the apparatus comprising:
- means for measuring a plurality of temporal intensity and temporal phase samples of the temporal electric field of light propagated through the optical device under test, where in the plurality of samples are measured for a plurality of input powers of the light, said means further including,
- means for generating a sampling light;
- means for measuring in synchronization with the sampling light, a first and a second quadrature output of an interference between the temporal electric field of the light and the electric field of the sampling light; and
- means for determining a the nonlinear property of the optical device under test using the plurality of measured temporal intensity and temporal phase samples by determining a proportional between a measured differential temporal phase and differential temporal intensity samples.

* * * * *